US008622458B2

(12) United States Patent
Hache

(10) Patent No.: US 8,622,458 B2
(45) Date of Patent: Jan. 7, 2014

(54) OPENING, IN PARTICULAR TAILGATE FOR AN AUTOMOBILE

(75) Inventor: Bertrand Hache, Saint CYR (FR)

(73) Assignee: Compagnie Plastic Omnium, Lyons (FR)

( * ) Notice: Subject to any disclaimer, the term of this patent is extended or adjusted under 35 U.S.C. 154(b) by 145 days.

(21) Appl. No.: 12/997,345

(22) PCT Filed: Jun. 10, 2009

(86) PCT No.: PCT/FR2009/051094
§ 371 (c)(1),
(2), (4) Date: Feb. 28, 2011

(87) PCT Pub. No.: WO2009/150377
PCT Pub. Date: Dec. 17, 2009

(65) Prior Publication Data
US 2011/0187150 A1  Aug. 4, 2011

(30) Foreign Application Priority Data
Jun. 12, 2008 (FR) ...................................... 08 53906

(51) Int. Cl.
*B60J 5/10* (2006.01)
(52) U.S. Cl.
USPC ........................................ 296/146.8; 296/56

(58) Field of Classification Search
USPC .............. 296/146.2, 146.3, 146.8, 146.16, 56
See application file for complete search history.

(56) References Cited

U.S. PATENT DOCUMENTS

| 4,343,504 A * | 8/1982 | Tomioka et al. ................. 296/76 |
| 4,535,503 A * | 8/1985 | Narita et al. ..................... 16/382 |
| 6,089,640 A * | 7/2000 | Cart ................................. 296/56 |
| 2003/0075948 A1* | 4/2003 | De Gaillard ............... 296/146.8 |
| 2003/0122399 A1* | 7/2003 | Seksaria et al. ............ 296/146.8 |
| 2011/0241376 A1* | 10/2011 | Igura .......................... 296/146.3 |

FOREIGN PATENT DOCUMENTS

| DE | 4419128 A1 | 12/1995 |
| EP | 1234702 A1 | 8/2002 |
| GB | 2290060 A | 12/1995 |
| JP | 2003120121 A | 4/2003 |

* cited by examiner

*Primary Examiner* — Jason S Morrow
(74) *Attorney, Agent, or Firm* — Jacox, Meckstroth & Jenkins

(57) ABSTRACT

A vehicle door having a window glass and a support element extending the window glass, the support element includes a door fastener for fastening the door to a body-in-white of the vehicle and a window glass fastener for fastening the window glass to the support element.

32 Claims, 1 Drawing Sheet

OPENING, IN PARTICULAR TAILGATE FOR AN AUTOMOBILE

CROSS-REFERENCE TO RELATED APPLICATIONS

This application is the U.S. National Phase application of PCT/FR2009/051094 filed June 10, which claims priority to French Application No. 0853906 filed Jun. 12, 2008, which applications are incorporated herein by reference and made a part hereof.

BACKGROUND OF THE INVENTION

1. Field of the Invention

The present invention relates to vehicle doors, in particular tailgates.

2. Description of the Related Art

In particular for city vehicles presenting a body with a small rear opening, it is known to provide a tailgate that does not include a box structure. A tailgate box structure is a structural element of the tailgate that serves to provide interfaces with the body, such as sealing or fastening interfaces, and that has a window glass associated therewith that forms a rear window and possibly also a bodywork part.

In contrast, the above-mentioned tailgate comprises solely a window glass forming the rear window of the vehicle, with at least one bodywork part and its lining fitted thereto. The tailgate is fastened to the body-in-white by means such as hinges, with the movable portions of the hinges likewise being fitted to the window glass. The tailgate is also connected to the body via props to assist in opening the tailgate, the props being fastened to the window glass. In addition, the window glass of that vehicle also provides a sealing track serving to provide sealing for the cabin when the door is closed.

Since such a tailgate does not include a lining forming a box structure, it is of small weight.

Nevertheless, fastening the window glass to the body via hinges enabling the tailgate to be pivoted relative to the body gives rise to high levels of stress in the glass. As a result, in order to ensure that it possesses mechanical properties that enable it to withstand such stresses, it is made to be quite thick, thus causing its weight to be relatively great.

What is needed, therefore, is a door and tailgate that enables a weight of the door to be reduced.

SUMMARY OF THE INVENTION

The invention enables the weight of such a door to be reduced.

To this end, one embodiment of the invention is to provide a motor vehicle door comprising a window glass and a support element extending the window glass, the support element comprising:

fastener means for fastening the door to a body-in-white of the vehicle; and fastener means for fastening the window glass to the support element.

This serves to decouple the window glass from the fastening between the door and the body. The fastening of the glass is thus no longer constrained by needs associated with moving the tailgate. It is therefore possible to fasten the window glass to the part in a manner that is more appropriate and that generates less stress in the glass. It is thus possible to reduce the thickness of the glass, and consequently its weight, correspondingly.

In addition, in spite of the presence of an additional part, such a door makes it possible to save on manufacturing costs. In addition to the savings in material achieved by reducing the thickness of the glass, there are also savings associated with the hinges serving to connect the door to the body. In the prior art, because of the complex method of shaping the glass constituting the window glass, it is difficult to round it so that it comes as close as possible to the roof of the vehicle. As a result, the hinges, which need their pivot axis to be situated as close as possible to the roof, have their movable portions that are fastened to the window glass in the form of lever arms that are relatively long. Hinges of that type are very expensive. In addition, a tailgate provided with such hinges is difficult to put into position.

Since the specifications for the tailgate do not justify the support element of the door being made necessarily of glass, the tailgate can be easier to shape, and its shape may be suitable for coming as close as possible to the roof of the vehicle. The hinges may then be of a type that is simpler, and they may thus be less expensive. Furthermore, it is simpler to position the tailgate on the vehicle and this can therefore be done in a shorter length of time.

The invention may also include one or more of the characteristics in the following list:

- the window glass fastener means are situated at a bottom end edge of the support element and co-operates with a top end edge of the window glass;
- the window glass fastener means comprise at least three fastening points, preferably at least five fastening points. Thus, by increasing the number of fastening points compared with the above-mentioned prior art, the stresses to which the tailgate is subjected are spread out. The stiffness of the window glass can thus be preserved while reducing its thickness;
- the fastening points between the support element and the window glass are distributed along the width of the door. The width of the door is the dimension thereof that extends along the transverse direction of the vehicle, when the door is mounted on the vehicle. The fastening points are thus also placed in the rounded portion of the window glass, situated beside the edges of the door that are at its ends in this direction. The inventors of the present invention have found that fastening the window glass at these locations serves to improve the fastening thereof and to reduce the stresses to which the glass is subjected. The thickness of the glass may thus be further reduced;
- the window glass and the support element are connected together by screw fastening, riveting, snap-fastening, or adhesive. When they are connected together by adhesive, they are bonded via an infinite number of fastening points extending over the entire width of the door;
- the fastener means for fastening the door to the body comprise at least one movable hinge portion, with the other hinge portion being fastened to the body-in-white;
- the support element is covered in a bodywork part and includes means for fastening the part. The bodywork part forms the top portion of the tailgate that is visible from the outside. This bodywork part, e.g., a spoiler, comprises a single skin, unlike the part in the above-mentioned prior art. The term "single skin" is used to mean that it is made as a single part that provides fastening interfaces and an appearance face that is visible from the outside of the vehicle. The bodywork part is placed in a zone of the tailgate that is subjected to quite high levels of stress, e.g., by aerodynamic forces or by washing the vehicle with a roller. In the prior art, the bodywork part is constituted by a skin that performs an appearance function and by a lining that performs a structural function serving to withstand external stresses. However, since the support element in the invention forms a structural element of the vehicle, there is no need to have a lining for the bodywork part, thereby achieving a further saving in the weight of the tailgate;

the means for fastening the bodywork part are distributed along the periphery of the support element. Because of the presence of the support element, and unlike the above-mentioned prior art in which fastening is performed to the window glass, it is possible to fasten the bodywork part at the most suitable locations of the support element. Fastening it at the periphery of the support element serves in particular to improve its positioning;

the support element includes at least one of the members in the following list:
  at least one ball joint for a prop for assisting in opening the door;
  a light;
  lighting for the cabin of the vehicle;
  at least one electric cable;
  an antenna;
  an element for connection to a defrosting system;
  a soundproofing seal;
    a motor system for assisted opening of the door; and
    at least one referencing element for use in mounting the door on the body-in-white.

As a result, most of the elements of the tailgate are incorporated in the support element prior to the tailgate being mounted on the vehicle and away from the main assembly line, thus achieving further savings in manufacturing costs. The support element thus constitutes a module uniting most of the functional elements of the tailgate. With reference in particular to the props, its ball joint is incorporated in the support element, i.e., it is no longer fastened to the window glass, so compared with the above-mentioned prior art, the window glass is relieved of the stresses that are generated by the props and may therefore present stiffness and thickness that are further reduced;

the window glass includes a sealing interface suitable for co-operating with a complementary interface of the body when the door is in its closed position. In particular, the window glass presents a surface that rests on a sealing gasket carried by the body when the door is in the closed position. It is thus the window glass that provides the tailgate with sealing given that there is no box structure. It should be observed that the support element is housed in the wet zone or gutter of the vehicle that is situated between the dry zone and the bodywork parts of the vehicle;

the support element is made at least in part out of plastics material, in particular a fiber-reinforced plastics material, such as a molding compound, e.g., sheet molding compound (SMC), advanced-molding compound (AMC), or bulk-mounding compound (BMC), or such as a reinforced thermoplastic material, e.g., polypropylene reinforced with long glass fibers (PPLGF). Thus, the support element is simple to fabricate. In addition, since the plastics material is of low density, the support element is of light weight and the additional weight due to its presence is far from compensating the weight saving achieved with the window glass as a result of its presence. Furthermore, since plastics material is quite easy to shape, it is possible to incorporate elements of the module, such as referencing elements, directly as a result of molding the plastic portion of the support element. Furthermore, the use of plastics material for forming the support element does not disturb the operation of the electrical elements incorporated in the module, such as the antenna; and the door forms a vehicle tailgate. It could equally well form a hood or a sun-roof for a vehicle.

The invention also provides a motor vehicle including a door of the invention.

The invention also provides a part for a vehicle door, the part supporting means for fastening the door to a body-in-white of the vehicle, and including in particular a movable portion of at least one hinge. At a bottom end edge of the part, such a part also includes fastener means for fitting a window glass to the part, the part not having any other fastener means for fitting the window glass to the part.

The invention also provides a method of fabricating a vehicle door, the method comprising the following steps in any order:
  fastening a top end edge of a window glass of the door to a bottom end edge of a part of the door; and
  mounting fastener means on the part for fastening the door to a body-in-white of the vehicle, the fastener means comprising in particular a movable portion of at least one hinge.

Optionally, other elements are fastened to the part, such as functional elements of the tailgate (e.g., a ball joint for a prop for assisting in opening the door, a light, means for lighting the vehicle cabin, at least one electric cable, an antenna, an element for connection to a defrosting system, a soundproofing seal, a motor system for assisting in opening the door, at least one reference element for mounting the door on the body-in-white), or a bodywork part of the vehicle.

Preferably, the part has fastened thereto initially the window glass, and then possibly the functional elements of the tailgate, and then optionally the bodywork part, and then the fastener means for fastening the door to the body are mounted on the part.

These and other objects and advantages of the invention will be apparent from the following description, the accompanying drawings and the appended claims.

BRIEF DESCRIPTION OF THE ACCOMPANYING DRAWINGS

The invention can be better understood on reading the following description given purely by way of example and made with reference to the drawings, in which.

DETAILED DESCRIPTION OF THE PREFERRED EMBODIMENTS

Figure 1:
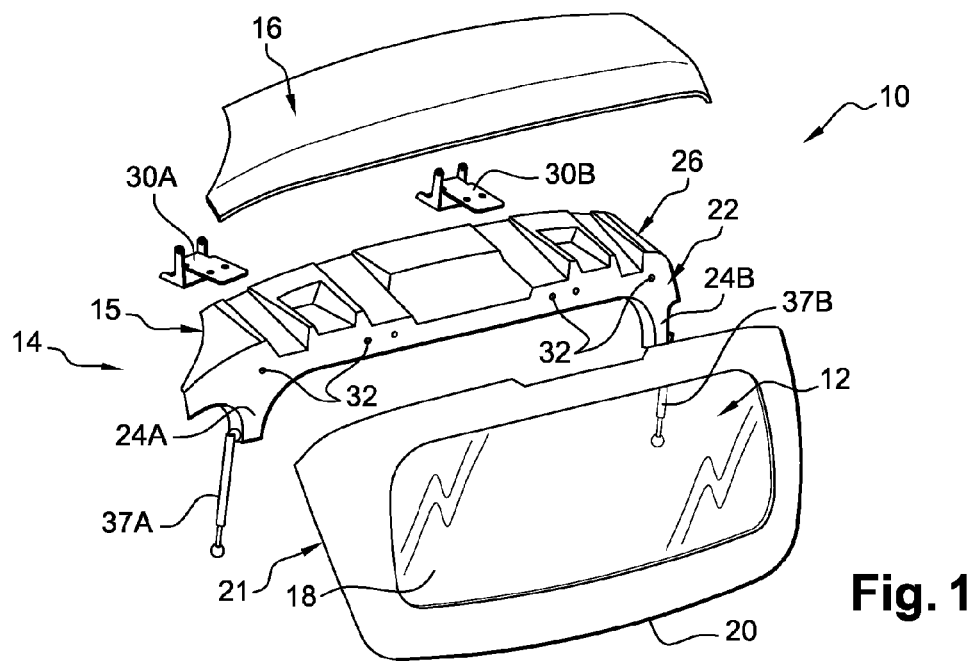
FIG. 1 is an exploded view of a door in an embodiment of the invention.

The figures show a door 10, constituting a vehicle tailgate. The door 10 has a window glass 12 in its bottom portion and a support element 14 in its top portion, the support element 14 being covered by a bodywork part 16, also referred to as a spoiler.

The window glass 12 and the spoiler 16 are visible from outside the vehicle once the tailgate has been assembled and is mounted on the vehicle.

The window glass 12 is made of glass or of a plastics material such as polycarbonate (PC). It forms a transparent rear window in its central portion 18 that allows light to pass into the cabin. At its periphery 20, on its face that is on the outside when mounted on the vehicle, the window glass is painted or covered in additional bodywork parts, so as to present the same color as the remainder of the bodywork.

Figure 2:
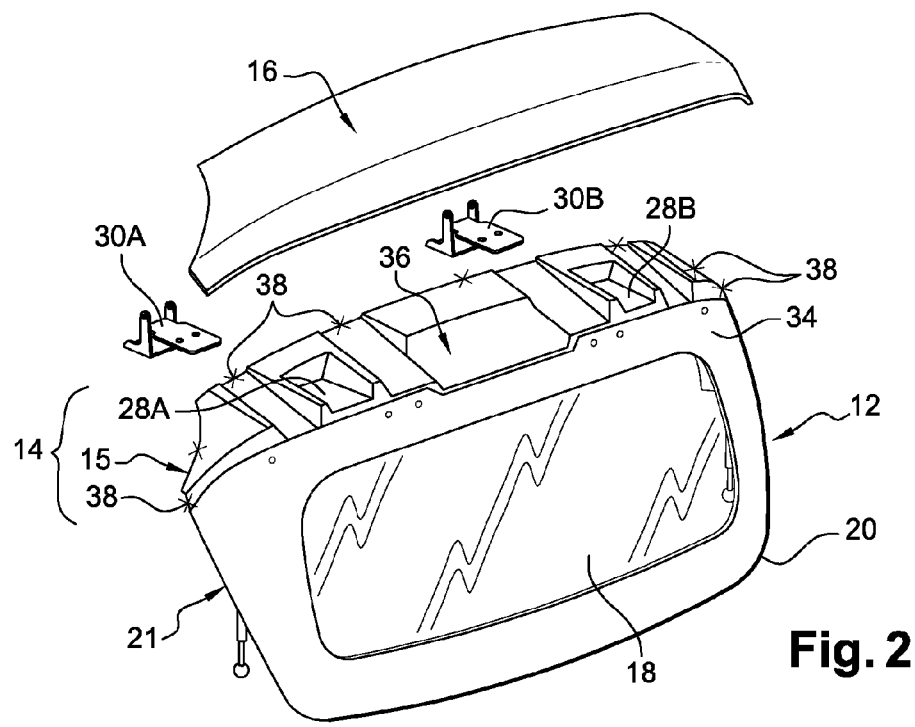
FIG. 2 is a view of the FIG. 1 door when partially assembled.

The window glass is of small thickness and is generally plane in shape so that when the tailgate is in its closed position on the body, it extends essentially perpendicularly relative to the longitudinal direction of the vehicle. As can be seen in FIG. 2, the edges 21 of the window glass that are at its ends in the transverse direction of the vehicle are curved or rounded towards the front, when the tailgate is mounted on the vehicle.

Since the tailgate does not have a box structure, the window glass 12 also includes a lock (not shown) at its bottom end for locking the tailgate in the closed position. The window glass also includes a sealing track (not shown) on its inside face that co-operates with a complementary track on the body-in-white that includes a sealing gasket so as to provide sealing between the tailgate and the body when the door is in the closed position.

The support element 14 comprises a part 15 made of fiber-reinforced plastics material so as to form a structural portion of the tailgate. This part 15 is made more particularly out of a molding compound such as sheet-molding compound (SMC), bulk-mounding compound (BMC), or advanced-molding compound (AMC), or out of a reinforced thermoplastic material, such as polypropylene reinforced with long glass fibers (PPLGF).

The part 15 forms a structural portion of the tailgate, which portion is of considerable stiffness and is capable of withstanding numerous stresses without deforming. Because of the presence of this part 15, the spoiler 16 need not have any structural function, even if the zone of the tailgate on which it is placed is subjected to relatively high levels of stress, e.g., aerodynamic stresses or while the vehicle is being washed with a roller. It is the part 15 that withstands such stresses.

The spoiler 16 comprises a single skin, i.e., it is made as a single part that includes fastener interfaces and that has an appearance face that is visible from the outside of the vehicle, being made of a thermoplastic material such as polypropylene (PP). It is painted to have the same color as the remainder of the bodywork and it serves essentially to perform an appearance function.

The part 15 includes two portions of small thickness that are essentially perpendicular to each other. The first portion 22 situated at the bottom portion of the part 15 extends the window glass when the tailgate is assembled and follows the shape thereof. It is thus for example a rounded part in the vicinity of its edges that are at its ends in the transverse direction of the vehicle when the tailgate is mounted on the vehicle. At each of its ends in the transverse direction of the vehicle it also includes a respective downwardly-extending vertical upright 24A, 24B.

The second portion 26 is situated in the top portion of the part 15 and extends the roof of the vehicle when the tailgate is mounted on the vehicle.

The support element 14 includes fastener means for fastening to the body-in-white of the motor vehicle, as can be seen more clearly in FIG. 2. These means are mounted on the part 15 in the second portion 26 thereof, more particularly in the zones 28A, 28B. These means are constituted by the movable portions 30A, 30B of two hinges. The movable portions 30A, 30B are fitted to the part 15 by screws. The part includes orifices for this purpose that co-operate with complementary orifices in the movable portions, and in which fastener elements, such as screws, are engaged.

These movable portions 30A, 30B co-operate with stationary portions of the hinges that are situated on the body-in-white and that are not shown in the drawings. The movable and stationary portions of each of the two hinges are connected together about a horizontal pivot axis that extends perpendicularly to the longitudinal direction of the vehicle, the axes of the two hinges being in alignment and situated as close as possible to the roof of the vehicle.

The support element 14, in particular the part 15, also includes screw fastener means for fastening the part 15 to the window glass 12, these means being located in the bottom portion 22 of the part 15. These fastener means comprise orifices 32 that co-operate with complementary orifices 34 formed in a top end edge of the window glass 12, as can be seen in particular in FIG. 2. When the window glass 12 is mounted on the support element, the orifices 32 and 34 overlie one another and fastener screws are inserted into these overlying orifices so as to enable the window glass 12 to be secured to the part 15. There are eight orifices 32 and 34 that are distributed over the entire width of the door 10, even in the rounded portions situated at the edges of the window glass 12 and the part 15 situated at their ends in the transverse direction of the vehicle.

This type of fastening serves to distribute stresses over a larger number of fastening points than when the window glass is fastened directly to the hinges. In addition, because some of the fastener orifices are formed in the rounded portions, in locations where the window glass possesses its greatest second moment of area, the window glass is subjected to lower levels of stress. Its thickness may therefore be considerably reduced.

Thus, the part 15 comprises a single piece and it alone suffices to support the window glass and to connect it to the body-in-white of the vehicle.

The part 15 also includes a location 36 for incorporating a tail light, e.g., a stop light. This location is situated in the top portion 26.

As can be seen in FIG. 1, the support element 14 also incorporates ball joints for fastening props 37A, 37B. In this way, the props 37A, 37B are supported by the part 15 at the ends of the uprights 24A, 24B. The ball joints are secured to the props at respective ones of their longitudinal ends. The props are fitted to the body at their other longitudinal ends. They serve to assist opening the tailgate.

It is particularly advantageous for the props not to be fastened to the window glass 12 since they give rise to high levels of stress while the tailgate is being opened. If the props were fastened to the window glass, that would require the stiffness of the window glass and consequently its thickness to be very large. By relieving the window glass of the stresses that are generated by the props, given that the props are fastened to the part 15, the thickness of the window glass may be reduced.

The spoiler 16 is also fastened to the part 15, at the periphery thereof, via fastening points 38 represented by crosses in FIG. 2. The spoiler 16 is fastened both to the portion 22 and to the portion 26 of the part 15, via numerous fastening points, more particularly eight points in this example, such that it is positioned as close as possible to the part 15 and to the window glass 12.

Thus, the door of the invention is most advantageous since it enables the weight of the tailgate window glass to be considerably reduced. The stiffness of the window glass may be reduced since it is subjected to lower levels of stress than in the prior art.

In addition, since the support element forms a module that may comprise numerous elements, the time required for mounting the tailgate on the main assembly line is reduced, thereby enabling manufacturing costs to be saved.

It should be observed that the invention is not limited to the embodiment described.

The support element may also incorporate other members that are not shown in the figures, such as lighting for the inside of the vehicle cabin, at least one electric cable, an antenna, an element for connection to a defrosting system, a soundproofing seal, a motor system for assisting opening of the door, at least one referencing element for use when mounting the door on the body-in-white, etc.

The means for fastening the window glass and the part together are not necessarily screw fastener means: by way of example, they could be connected together by riveting, snap-fastening, or by any other mechanical fastening means, or by adhesive, in which case the part should include an adhesive track and the window glass and the support element would be connected together by an infinite number of fastening points.

The door is not necessarily a vehicle tailgate, and for example it may relate to a sun-roof or to a hood.

In addition, the shapes and the materials used for the various elements of the door are not limited to those described.

While the apparatus, systems/methods, forms of apparatus, system, method and embodiments described herein constitute preferred embodiments of this invention, it is to be understood that use of the invention is not limited to these precise apparatus, systems/methods, forms of apparatus, system, method and embodiments and that changes may be made in either without departing from the scope of the invention, which is defined in the appended claims.

What is claimed is:

1. A vehicle door, forming a tailgate, wherein said vehicle door comprises a window glass and a support element extending said window glass, said support element comprising:
   means for fastening said vehicle door to a body-in-white of a vehicle, and
   means for fastening said window glass to said support element, said means for fastening said window glass being situated at a bottom end edge of said support element and co-operating with a top end edge of said window glass; said support element comprising a part that supports said means for fastening said vehicle door to said body-in-white of said vehicle, said part including, at a bottom end edge, said means for fastening said window glass, said part having no other means for fastening said window glass;
   wherein said support element pivots between open and closed positions when said vehicle door is moved between open and closed positions, respectively;
   said part providing a frame member that is the only frame member that supports said window glass and that extends only across a substantial width of said top end edge of said window glass.

2. The vehicle door according to claim 1, wherein said means for fastening said window glass comprises at least three fastening points.

3. The vehicle door according to claim 1, wherein said window glass and said support element are connected together by screw fastening, riveting, snap-fastening, or adhesive.

4. The vehicle door according to claim 1, wherein said means for fastening said vehicle door to said body-in-white comprises at least one movable hinge portion.

5. The vehicle door according to claim 1, wherein said support element is covered by a bodywork part and includes means for fastening said part.

6. The vehicle door according to claim 1, wherein said support element includes at least one of the members in the following list:
   at least one ball joint for a prop for assisting in opening said vehicle door;
   a light;
   lighting for a cabin of a vehicle;
   at least one electric cable;
   an antenna;
   an element for connection to a defrosting system;
   a soundproofing seal;
   a motor system for assisted opening of said vehicle door; and
   at least one referencing element for use in mounting said vehicle door on said body-in-white.

7. The vehicle door according to claim 1, wherein said support element is made at least in part out of plastics material.

8. A vehicle including a door according to claim 1.

9. A method of fabricating a vehicle door, wherein said method comprises
   fastening a top end edge of a window glass of said vehicle door to a bottom end edge of a part of said vehicle door; and
   mounting on said part means for fastening said vehicle door to a vehicle body, said means for fastening said vehicle door to a vehicle body comprising in particular a movable portion of at least one hinge;
   wherein said movable portion of said at least one hinge of said vehicle door pivots between open and closed positions when said vehicle door is moved between open and closed positions, respectively;
   said part providing a frame member that is the only frame member that supports said window glass and that extends only across a substantial width of said top end edge of said window glass.

10. A vehicle door, forming a tailgate, wherein said vehicle door comprises:
    a window glass and a support element extending said window glass;
    said support element comprising:
      a door fastener for fastening said vehicle door to a vehicle; and
      a window glass fastener for fastening said window glass to said support element, said window glass fastener being situated at a bottom end edge of said support element and co-operating with a top end edge of said window glass; said support element comprising a part that supports said door fastener for fastening said vehicle door to said vehicle, said part including, at said bottom end edge, said window glass fastener for fastening said window glass to said support element, with no other means for fastening said window glass to said support element;
    wherein said support element pivots between open and closed positions when said vehicle door is moved between open and closed positions, respectively;
    said part providing a frame member that is the only frame member that supports said window glass and that extends only across a substantial width of said top end edge of said window glass.

11. The vehicle door according to claim 9, wherein said window glass fastener comprises at least three fastening points distributed in particular across a width of said vehicle door.

12. The vehicle door according to claim 9, wherein said window glass and said support element are connected together by screw fastening, riveting, snap-fastening, or adhesive.

13. The vehicle door according to claim 9, wherein said door fastener for fastening said vehicle door to a body comprise at least one movable hinge portion.

14. The vehicle door according to claim 10, wherein said support element is covered by a bodywork part and includes a part fastener.

15. The vehicle door according to claim 10, wherein said support element includes at least one of the members:
at least one ball joint for a prop for assisting in opening said vehicle door;
a light;
lighting for a cabin of a vehicle;
at least one electric cable;
an antenna;
an element for connection to a defrosting system;
a soundproofing seal;
a motor system for assisted opening of said vehicle door; or
at least one referencing element for use in mounting said vehicle door on a body-in-white.

16. The vehicle door according to claim 10, wherein said support element is made at least in part out of plastics material.

17. A vehicle including a door according to claim 10.

18. The vehicle door according to claim 2 wherein said means for fastening said window glass has at least five fastening points.

19. The vehicle door according to claim 2, wherein said window glass fastening points are distributed in particular across a width of said vehicle door.

20. The vehicle door according to claim 5, wherein said part fastener being distributed at a periphery of said support element.

21. The vehicle door according to claim 7, wherein said plastics material is a fiber-reinforced plastics material.

22. The vehicle door according to claim 21, wherein said fiber-reinforced plastics material is a molding compound.

23. The vehicle door according to claim 22, wherein said molding compound can be sheet molding compound, advanced-molding compound, or bulk-molding compound.

24. The vehicle door according to claim 21, wherein said fiber-reinforced plastics material is a reinforced thermoplastic material.

25. The vehicle door according to claim 24, wherein said reinforced thermoplastic material is polypropylene reinforced with long glass fibers.

26. The method according to claim 9, wherein said door fastener comprises a bodywork part.

27. The vehicle door according to claim 16, wherein said plastics material is a fiber-reinforced plastics material.

28. The vehicle door according to claim 27, wherein said fiber-reinforced plastics material is a molding compound.

29. The vehicle door according to claim 28, wherein said molding compound can be sheet molding compound, advanced-molding compound, or bulk-molding compound.

30. The vehicle door according to claim 27, wherein said fiber-reinforced plastics material is a reinforced thermoplastic material.

31. The vehicle door according to claim 30, wherein said reinforced thermoplastic material is polypropylene reinforced with long glass fibers.

32. The vehicle door according to claim 14, wherein said part fastener is distributed at a periphery of said support element for fastening.

* * * * *